(12) United States Patent
Rawson

(10) Patent No.: US 6,182,223 B1
(45) Date of Patent: Jan. 30, 2001

(54) METHOD AND APPARATUS FOR PREVENTING UNAUTHORIZED ACCESS TO COMPUTER-STORED INFORMATION

(75) Inventor: Andrew R. Rawson, Cedar Park, TX (US)

(73) Assignee: International Business Machines Corporation, Armonk, NY (US)

(*) Notice: Under 35 U.S.C. 154(b), the term of this patent shall be extended for 0 days.

(21) Appl. No.: 09/095,185

(22) Filed: Jun. 10, 1998

(51) Int. Cl.[7] ............................................... G06F 1/24
(52) U.S. Cl. ......................................... 713/200; 713/165
(58) Field of Search ................................... 713/200, 201, 713/164, 165, 194; 705/51

(56) References Cited

U.S. PATENT DOCUMENTS

| | | |
|---|---|---|
| 4,914,572 * | 4/1990 | Bitzinger et al. .................. 714/10 |
| 4,951,249 | 8/1990 | McClung et al. .................. 364/900 |
| 5,361,359 | 11/1994 | Tajalli et al. .................... 395/700 |
| 5,515,540 * | 5/1996 | Grider et al. ..................... 713/200 |
| 5,557,742 | 9/1996 | Smaha et al. ..................... 395/186 |
| 5,566,339 | 10/1996 | Perholz et al. .................... 395/750 |
| 5,919,258 * | 7/1999 | Kayashima et al. ................ 713/201 |

* cited by examiner

Primary Examiner—Robert W. Beausoliel, Jr.
Assistant Examiner—Christopher Revak
(74) Attorney, Agent, or Firm—Richard A. Henkler; Paul Kraft; Leslie A. VanLeeuwen

(57) ABSTRACT

A method and apparatus of a computer based security system to prevent unauthorized access to computer-stored information comprising several components. These comprise of an intrusion detection mechanism, a ROM-based firmware program, an internal battery sized to provide several minutes of operation of the computer system and all its internal devices, and a mechanism to reset the central processing unit of the computer and switch to battery power responsive to the intrusion detection mechanism.

26 Claims, 5 Drawing Sheets

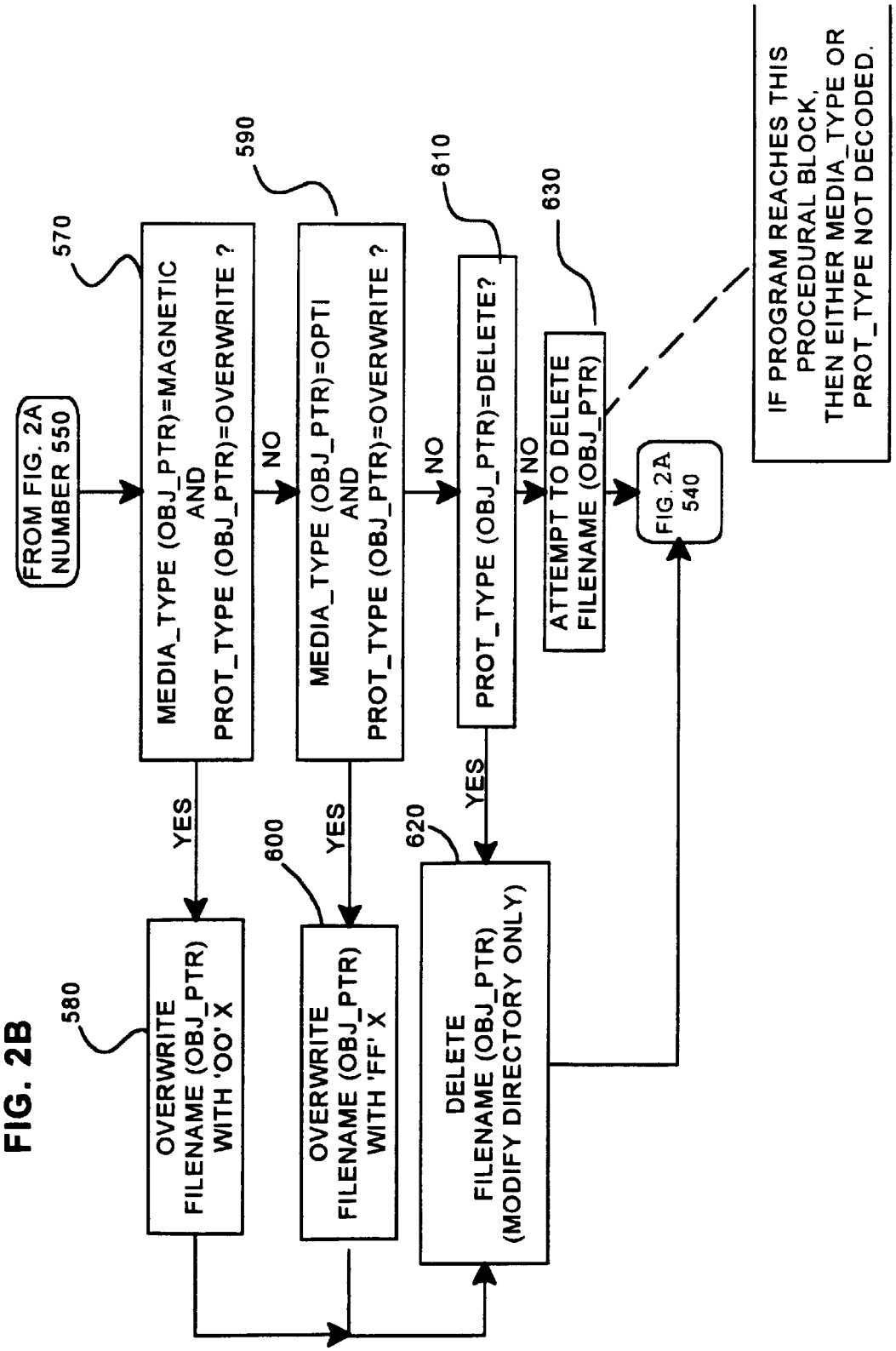

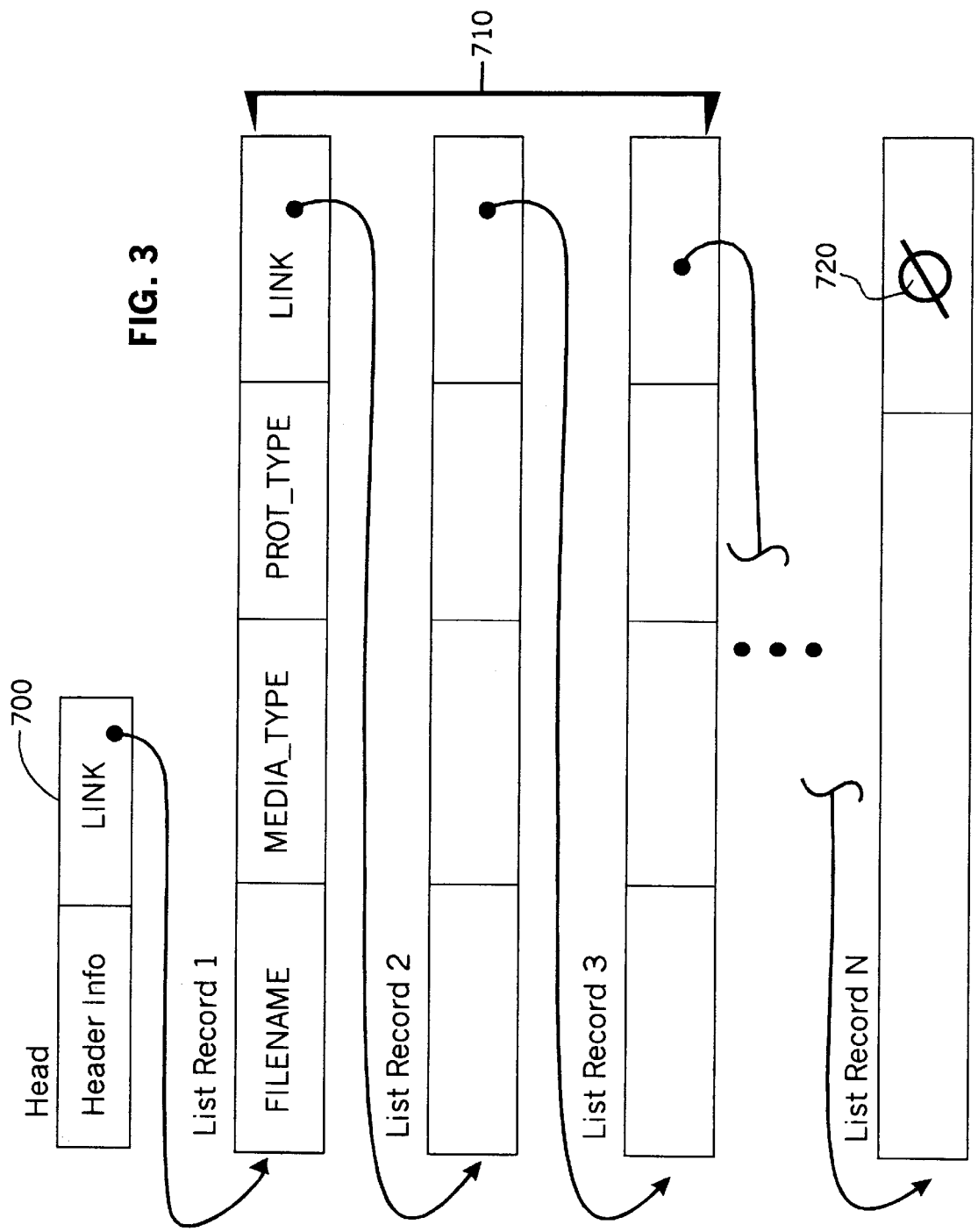

METHOD AND APPARATUS FOR PREVENTING UNAUTHORIZED ACCESS TO COMPUTER-STORED INFORMATION

TECHNICAL FIELD

The present invention involves the use of various anti-theft and anti-invasive techniques to prevent intrusion into confidential data stored in portable, desktop and deskside computers. Such computers are highly vulnerable to unauthorized access. This is because they are relatively easy to gain access and also physically remove from the owner's premises. Once removed, data contained therein can be intruded upon at the invader's leisure.

BACKGROUND OF THE INVENTION

The number of computers in business and private applications is growing at an enormous rate and many firms have thousands of computers throughout their organizations. In contrast to the high security traditionally afforded computer equipment in the past, the portable, desktop and deskside are not generally located in high security areas or, as in the past, operated by a few highly trained and highly trusted personnel. Currently, personal computers are often left on desks where anyone with an operating system boot diskette can access any data stored within the computer with the potential for theft and/or tampering of proprietary information. Additionally, the location of such computers in unsecured areas and their relatively small physical size leads to the theft of the equipment itself. When a computer system is stolen so is the valuable information contained within it.

Thus, the data stored in either a portable, desktop or deskside computer is highly vulnerable to unauthorized access merely because these computers are relatively easy to remove from the owner's premises. This data is contained in system memory and nonvolatile secondary storage such as floppy disks, hard disks, tape, magneto-optical writable media, etc. And while information contained in the volatile system memory of AC-powered desktop or deskside computers will very likely be lost as a direct result of physically removing the computer, a portable battery operated computer can hold the contents of memory for several hours. In addition, if the computer is equipped with rapid resume capabilities, system software has the ability to copy the contents of volatile system memory onto nonvolatile secondary storage making the record of the information previously contained in system memory permanent. Thus, once the system unit, along with its internal storage devices and media are removed from the owner's premises, the data intrusion expert has unlimited time and tools available to mine the sensitive information contained within.

The traditional prior art approach to protecting the data contained in a computer system is to wrap the storage device in a steel case and provide lockable doors to prevent the removal of removable media such as floppy disks. The unit is then affixed to something considered to be immovable such as a column, desk or large table. Often the means of affixing the system unit is a steel cable. Obviously, none of these crude measures are effective against a determined and clever thief.

As an example, assume that a computer system is provided with a lockable cover and the covers and locking mechanism are designed so as to make any attempt at unauthorized entry evident. Even if the cover and lock arrangement works and produces clear evidence that the covers have been tampered with, once the computer system is removed from the owner's premises, the evidence is removed as well.

Another security feature often provided is the entry and verification of a password before allowing access to any data contained in the computer. This is only effective as long as the storage devices remain secured within a locked and intact enclosure. Once the physical defenses of the system unit are breached, the thief is free to attach the storage device to another computer which he can use as a tool to access the data contained therein.

SUMMARY OF THE INVENTION

The present invention consists of a computer based security system to prevent unauthorized access to computer-stored information comprising several components. These are comprised of an intrusion detection mechanism, a ROM-based firmware program, an internal auxiliary power source, such as a battery sized to provide several minutes of operation of the computer system and all its internal devices, and a mechanism to reset the central processing unit of the computer and switch to a self contained power supply (i.e. battery power) responsive to the intrusion detection mechanism.

Thus, the present invention is superior to that of the prior art in that all the owner sensitive data is erased before the thief knows that an intrusion has been detected, thus eliminating the possibility of subsequent examination and decryption of the stolen information. A further advantage of the instant invention is that security of the data is not dependent on the physical security of the computer itself. Additionally, it protects data contained in all integrated volatile and nonvolatile storage devices and media, not just some selected device.

The intrusion detection mechanism can take numerous forms. One effective mechanism is a spring-loaded switch within the unit which is held in an electrically open position by the weight of the computer; the movement of which causes a switch to close, triggering an intrusion detection mechanism. Another detects the unauthorized removal of the computer cover triggering an intrusion detection mechanism and yet another mechanism involves a magnetic coupling of the continued proximity of the floor or table upon which the unit rests.

BRIEF DESCRIPTION OF THE DRAWINGS

FIG. 3 specifies the Security Priority Data Format. It represents the data structure which specifies the system files and other data objects which are to be overwritten on secondary storage and/or deleted from the file system of the computer during the execution of the security program.

DETAILED DESCRIPTION OF THE PREFERRED EMBODIMENT

Figure 1A:
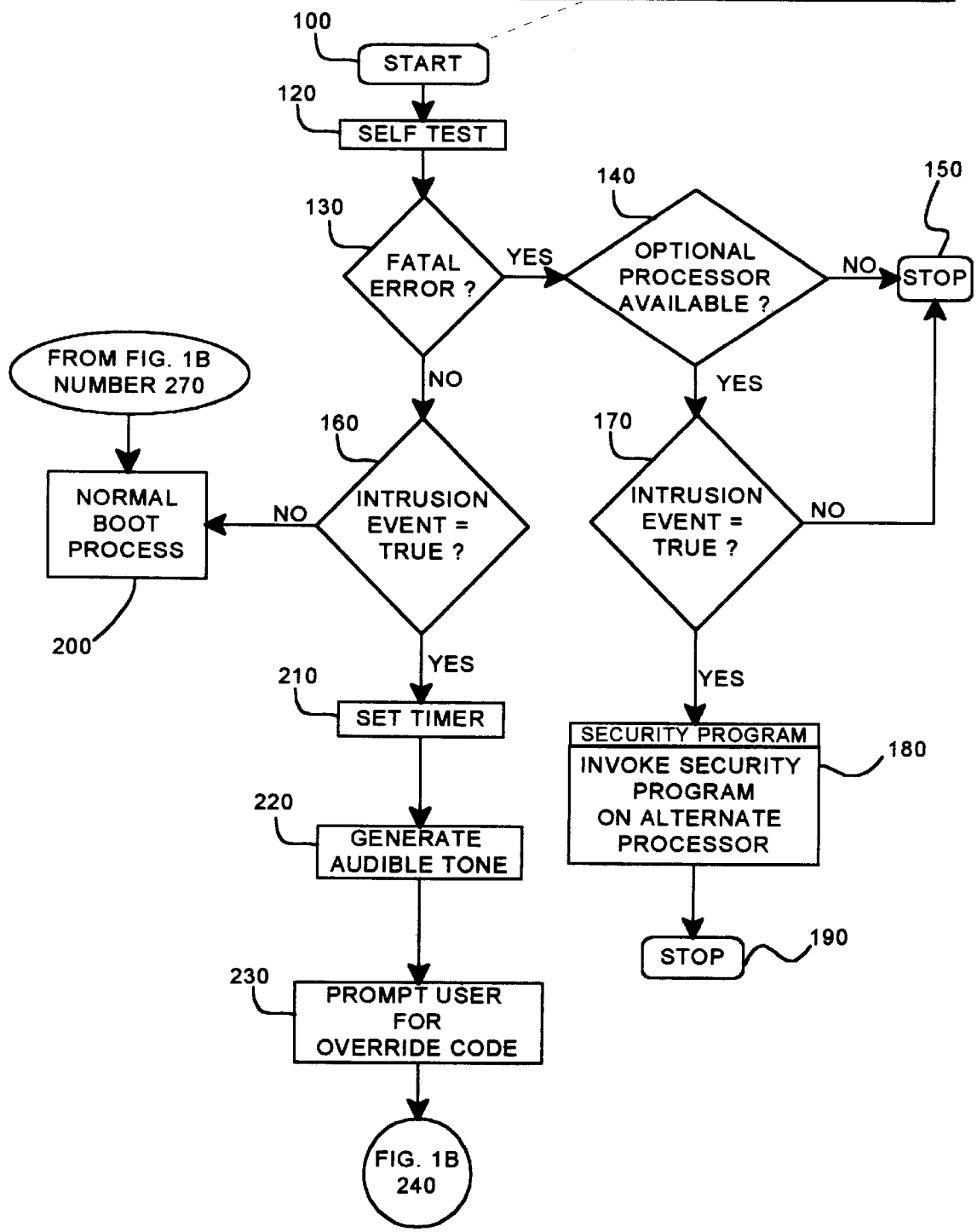
FIGS. 1A/1B is a procedural flowchart that provides an overview of the preferred embodiment of the instant invention.

The following represents a detailed description of the instant invention. FIGS. 1A/1B is a procedural flowchart which illustrates the preferred embodiment of this invention. This flowchart details a process which comprises an intrusion detection mechanism, a program executed on the central processing unit (CPU) and a program executing on an optional alternate processor specifically included in the system for security purposes. The following paragraphs describe the preferred embodiment in full detail.

Assumed is an intrusion detection mechanism which is capable of asserting a hardware reset to the CPU and, once triggered by the detected intrusion event, maintains this state information in a processor readable latch. The current state of this latch is denoted by the variable intrusion_event. The variable intrusion_event is FALSE until an intrusion event is detected. It then changes to TRUE when such an event occurs and remains in the TRUE state until reset to FALSE by an unspecified service repair action.

The main CPU of the computer system is the primary execution vehicle for the illustrated program. However, an optional processor may be provided within the computer system to take over the execution of an equivalent process in the event the main CPU is inoperable.

The process of this embodiment starts at block 100 FIG. 1A, and is initiated by a hardware reset directed to the main CPU. However, alternate mechanisms for invocation of this process are also possible. Since this is the normal entry point for the ROM-based initialization and configuration (boot) code, the process flow enters the process block 120 which represents the initial sequence of the computer's normal self test. This set of tests is the minimum required to ensure that the CPU and necessary I/O components are functional. This process block leads directly to the decision block 130.

Decision block 130 diverts the procedural flow to execute on the optional alternate processor if the results of the self test indicate some fatal error. This is the leg which leads to decision block 140. If the optional processor is not available, the procedural flow ends at terminal block 150. In this case there is nothing more which can be done to protect the data objects contained in the computer since the primary hardware is no longer operational.

However, if an alternate processor is available, the procedural flow continues to decision block 170. Here the intrusion mechanism is interrogated to determine if an intrusion event occurred. If the variable intrusion_event is TRUE, the security program is invoked utilizing the alternate processor. This is designated in this flow as the subprocess block 180. This subprocess is the same subprocess which the main CPU executes in the subprocess block 280 and is described in detail below. On return from the security program subprocess, the procedural flow terminates in the stop block 190.

If the variable intrusion_event is FALSE, the procedural flow terminates at block 150. In this case, since no intrusion event has occurred, there is nothing more to do. The system is not under attack, it merely needs to be serviced.

Returning to the flow at decision block 130, we now trace the "No" decision leg. Here the computer system has been determined to be functional and the procedure continues to decision block 160. Decision block 160 interrogates the intrusion detection mechanism. If the variable intrusion_ event is not TRUE, then no intrusion has been detected and the boot process continues normally. This is represented by block 200. The remainder of this process is beyond the scope of this invention.

However, if the state of the variable intrusion_event tested in decision block 160 is TRUE, the procedure continues to block 210. Here a hardware timer is started. This is used to mark the elapsed time since the CPU has reached a point in its execution. The flow continues to process block 220. A brief audible tone is generated via a mechanism which is normally available in a computer system. This is to alert a user that a problem requiring attention has occurred.

The next process block 230 specifies that a prompt should be written to an available display device requiring an override code. The override code has been previously setup by the owner/user and has been retained in a nonvolatile storage device in the system.

Figure 1B:
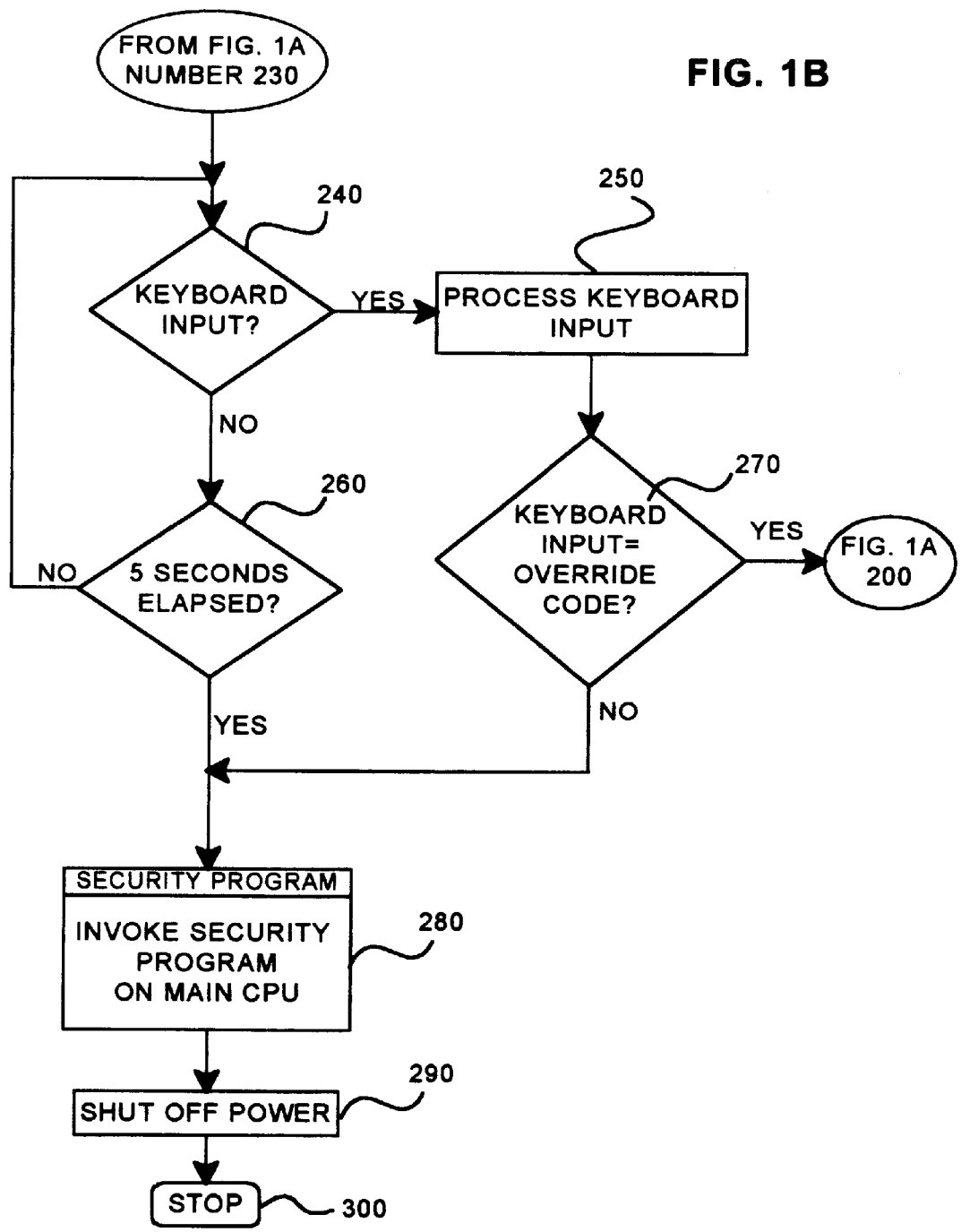

Decision block 240, FIG. 1B, polls the keyboard device input and decision block 260 keeps track of the elapsed time by reading the current value in the timer which was cleared and started in the process block 210. The terminal elapsed time value of five seconds is illustrative and can be adjusted based on requirements.

If keyboard input is detected in decision block 240 (a line of data terminated by the ENTER key is assumed), flow goes to process block 250 where this input is read from the keyboard device. The process then flows to decision block 270 where the keyboard input string is compared to the override_code string stored in the nonvolatile memory. If the input matches the stored string, then the security process is diverted and the flow returns to the normal boot process in block 200.

If either the designated elapse time expires or the entered code does not match the stored code, then the security program is invoked on the main CPU in the subprocess block 280. Upon return from the subprocess block, flow goes directly to block 290 in which the main CPU turns off all power to the computer system. This overview procedural flow then terminates at block 300.

Figure 2A:
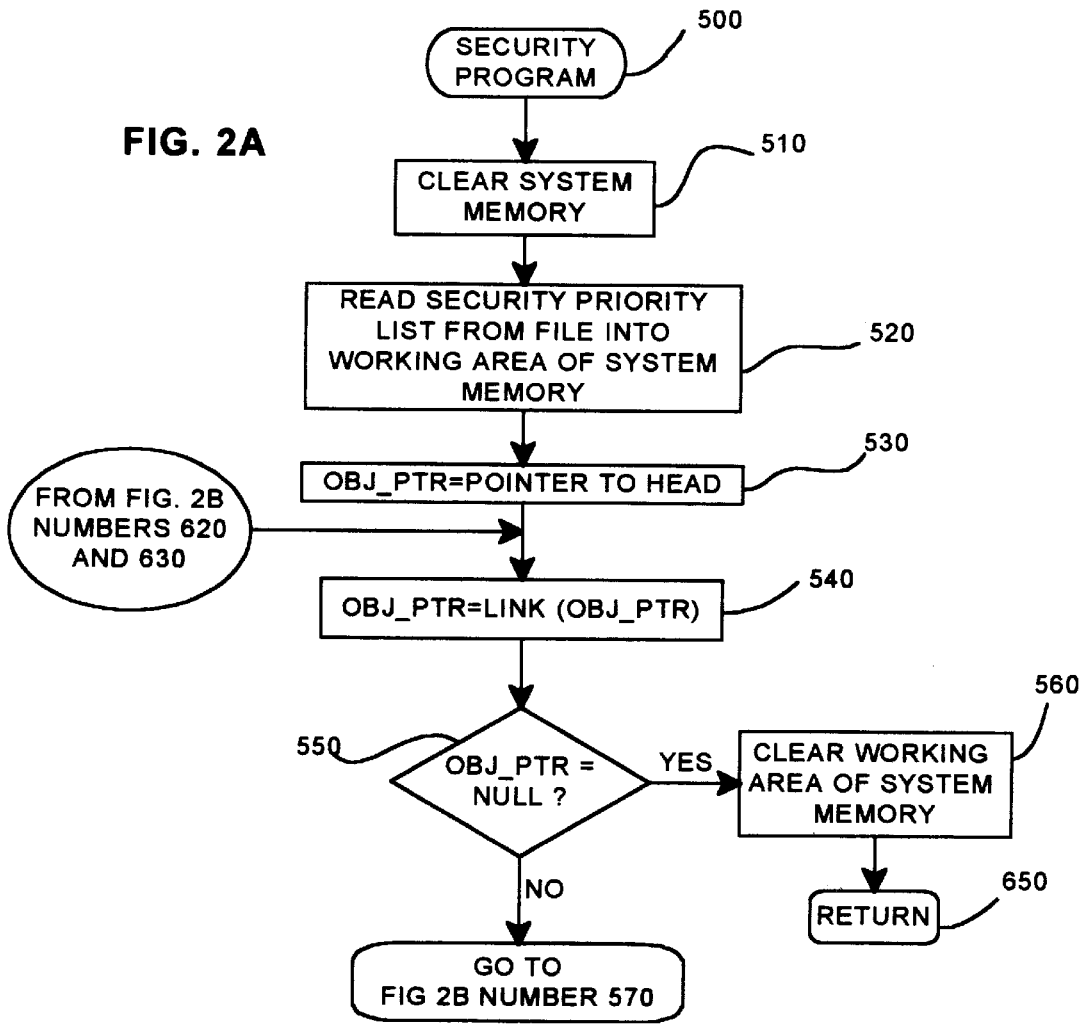
FIGS. 2A/2B is a flowchart of the Security Program Subprocess represented by subprocess block 180 of FIG. 1A, labeled: "invoke security program on alternate processor". This subprocess also appears in subprocess block 280 of FIG. 1B.

For the following discussion refer to FIGS. 2A/2B. The purpose of this subprocess is to execute the specified protection actions against the sensitive data objects contained in the security Priority List data structure specified in FIG. 3. This data structure has been set up by the user or security administrator utilizing a software tool designed for this purpose. This data structure is either stored in the file system in an invisible file or alternately could be written to non-volatile memory.

Start block 500, FIG. 2A, represents the start of this subprocess which is to be invoked on either the main CPU or in an optional processor available within the computer system. This subprocess begins in the process block 510 with the clearing of all system memory. It is assumed that the ROM-based security program has the functional code necessary to read and write all secondary storage devices in the computer system which may contain sensitive data objects, although this is not essential. If not, trusted code may be loaded from the filesystem to aid in the process.

Process block 520 represents the reading of the security Priority List from the filesystem or nonvolatile memory and placing it in a working area of system memory. The format of this data structure, which is a simple linked list, is detailed in FIG. 3.

To understand the processing of this data structure, some of the detail needs to be explained. The first record of this data structure denoted head 700 in FIG. 3 contains two fields. The first contains certain header information and the second called link contains a pointer to the first of a list of records 710 providing information about the data objects to be operated upon and the specific actions to be taken to secure the data.

Each record 710 is composed of four fields. The first, filename, gives the filesystem path to the object. The second, media_type, specifies the type of storage media which holds the object data. The third, prot_type, specifies the type of action to take against the object and the last field, link, provides a pointer to the next record in the list. The list can be composed of any number of records 710 and is terminated when a NULL pointer 720 is found in the link field.

Values for the media_type variables are "magnetic" and "opti" and specify how the data object should be overwritten. Values for prot_type are "overwrite" and "delete". "Overwrite" means that the low level sectors on the storage media should be overwritten. "Delete" means that only the entries in the filesystem directory structure should be modified. This is much faster than overwriting but provides only limited protection. Delete should be reserved for data objects of limited sensitivity.

Returning to the Security Program Subprocess flow chart of FIG. 2A, we continue the process block 530. Here variable obj_ptr is loaded with a pointer to the head record. This initializes obj_ptr prior to entering the loop structure which threads the list and operates on the data objects. This loop is represented by blocks, FIG. 2A, at 540, 550, FIG. 2B, at 570, 580, 590, 600, 610, 620, and 630.

The first block in the loop is the process block, FIG. 2A, at 540. Here the variable obj_ptr takes on the value stored in the link field of the record pointed to by the old value of the obj_ptr. On the first iteration through the loop, this points to the first record 710 describing the first data object to be operated upon. Flow goes to decision block, FIG. 2A, at 550. Here the list termination condition is queried. Given that the list has at least one record 710, the process flow will follow the "No" leg to a series of decision blocks whose purpose is to decode the types of objects and actions to be taken upon them as determined by the Security Priority List.

Consider first the decision block, FIG. 2B, at 570. Here the values in the media_type and prot_type fields are tested. If the media_type is "magnetic" and the prot_type is "overwrite", then the flow follows the "yes" leg to the process block 580 where the specified action on the file specified by filename is performed. Since magnetic media (floppies, hardfiles and tape) can just as easily be overwritten as zeros or ones, this process determines rather arbitrarily to set all the bits to zeros. If either of these conditions is not true, flow continues to the next decision block 590. Here the conditions media_type="opti" and prot_type="overwrite" are tested. If both are TRUE, flow moves to process block 600 where the specified operation is carried out. Here, due to the media type, the only overwrite operation which is possible is to write all ones.

If either condition tested in decision block 590 is FALSE, then procedural flow continues to decision block 610. In block 610, regardless of the media_type, if prot_type "delete", then an operation equivalent to deleting the file from the directory structure is performed. This is shown in process block 620. Note that following process blocks 580 and 600, flow enters block 620 as well to ensure that after an object has been overwritten, it is also removed from the filesystem directory structure. Flow from block 620 goes back to the top of the loop at process block 540.

If the "No" leg of decision block 610 is taken, the value of media_type and/or prot_type do not match one of the known values. In general, this would happen only in an error situation. Process block 630 attempts to perform the delete operation on the data object before returning to the top of the loop to process the next object.

The loop terminates when the last record in the list has been processed and the NULL link 720 in the final record is loaded into obj_ptr in process block 540. The decision block 550 tests the value of the pointer and finds it equal to NULL. Procedural flow moves to block 560 where the processor "cleans up after itself" by overwriting all of the working system memory space utilized by the Security Program itself. After this, the subprocess terminates in block 650. At this point, flow returns to the point of invocation in FIG. 1A.

As noted above, if the main CPU is executing the process, flow proceeds to process block 290 FIG. 1B, where power is shut off and the overall process terminates in block 300.

Another embodiment of this invention includes an intrusion detection mechanism which is a spring-loaded switch within the computer system maintained in the electrically open position by the shear weight of said computer system. When the computer is moved or relocated, this switch closes, triggering the intrusion detection mechanism.

Still a further embodiment of this invention involves the detection of the unauthorized removal of the covers of the computer system. This would trigger the intrusion detection mechanism.

Yet another embodiment of this invention involves an intrusion detection mechanism which is a magnetic coupling of the continued proximity of the floor or table upon which the computer system rests. The movement or breaking of this coupling would trigger the intrusion detection mechanism.

Although certain preferred embodiments have been shown and described, it will be understood that many changes and modifications may be made therein without departing from the scope and intent of the appended claims.

What is claimed is:

1. A computer based security system to prevent unauthorized access to computer-stored information, comprising:

a mechanism for detecting an intrusion into said computer;

a self contained power supply to provide sufficient operation time for said computer system to execute specific protective actions;

a switch to said self contained power supply, responsive to said intrusion detection mechanism;

a mechanism to reset the central processing unit of said computer responsive to said intrusion detection mechanism;

a ROM-based firmware program containing a procedure, in said firmware program, to specify the data, files and objects in secondary storage, that are to be overwritten or deleted from said computer file system upon said intrusion, and upon said intrusion, said system immediately executes specific protection actions against sensitive data objects contained in a security priority list of data structures.

2. The system of claim 1, wherein said power supply is a battery, sized to provide several minutes of operation of said computer system and all its integrated secondary storage devices.

3. The system of claim 1, wherein said intrusion detection mechanism is a spring-loaded switch within said computer system which is maintained in the electrically open position by the shear weight of said computer system, and when said computer is moved or relocated, said switch closes, triggering said intrusion detection mechanism.

4. The system of claim 3 wherein the detection of the unauthorized removal of the covers of said computer system, triggers said intrusion detection mechanism.

5. The system of claim 1, wherein said intrusion detection mechanism is a magnetic coupling of the continued proximity of the floor or table upon which said computer system rests.

6. The system of claim 1, wherein an optional processor may be provided within said computer system to take over the execution of an equivalent process in the event the central processing unit is inoperable.

7. The system of claim 1, wherein once said intrusion mechanism is triggered, it causes said system to be powered by the self contained power supply causing said computer to reset; and said ROM-based firmware program to take control and determine that an intrusion event occurred, thus erasing all data in said system and secondary storage.

8. A computer based security system to prevent unauthorized access to computer-stored information, comprising:

a mechanism for detecting an intrusion into said computer;

a self contained power supply to provide sufficient operation time for said computer system to execute specific protective actions;

a switch to said self contained power supply responsive to said intrusion detection mechanism;

a mechanism to reset the central processing unit of said computer responsive to said intrusion detection mechanism;

a ROM-based firmware program;

a intrusion detection mechanism which when triggered, causes said computer system to be powered by the self contained power supply, causing said computer system to reset; said ROM-based firmware program then takes control and determines that an intrusion event occurred, thus erasing, on a prioritized manner, all data in said system and secondary storage; and said firmware which is personalized by means of tables stored in non-private RAM, erases various user critical data first to assure their destruction.

9. The system of claim 8, wherein said system employs a procedure in said firmware program, to specify the data, files and objects in secondary storage, that are to be overwritten or deleted from said computer file system upon said intrusion.

10. The system of claim 8 wherein said power supply is a battery, sized to provide several minutes of operation of said computer system and all its integrated secondary storage devices.

11. The system of claim 8, wherein said intrusion detection mechanism is a spring-loaded switch within said computer system which is maintained in the electrically open position by the shear weight of said computer system, and when said computer is moved or relocated, said switch closes, triggering said intrusion detection mechanism.

12. The system of claim 11 wherein the detection of the unauthorized removal of the covers of said computer system, triggers said intrusion detection mechanism.

13. The system of claim 8 wherein said intrusion detection mechanism is a magnetic coupling of the continued proximity of the floor or table upon which said computer system rests.

14. The system of claim 8 wherein an optional processor may be provided within said computer system to take over the execution of an equivalent process in the event the central processing unit is inoperable.

15. The system of claim 8 wherein once said intrusion mechanism is triggered, it causes said system to be powered by the self contained power supply causing said computer to reset; and said ROM-based firmware program to take control and determine that an intrusion event occurred, thus erasing all data in said system and secondary storage.

16. A computer based security method to prevent unauthorized access to computer-stored information, comprising the steps of:

providing a mechanism for detecting an intrusion into said computer;

employing a self contained power supply to provide sufficient operation time for said computer to execute specific protective actions;

resetting said central processing unit of said computer, responsive to said intrusion detection; and switching to said self contained power supply responsive to said intrusion detection mechanism; and resetting said central processing unit of said computer responsive to said intrusion detection mechanism;

providing a ROM-based firmware program containing a procedure in said firmware program, to specify the data, files and objects in secondary storage, that are to be overwritten or deleted from said computer file system upon said intrusion, and upon said intrusion, said system immediately executes specific protection actions against sensitive data objects contained in a security priority list of data structures.

17. The system of claim 16 further including the steps of:

detecting unauthorized removal of the covers of said computer system, triggers said intrusion detection mechanism.

18. The method of claim 17, further including the steps of:

providing said intrusion detection mechanism as a spring-loaded switch, within said computer system, which is maintained in the electrically open position by the shear weight of said computer system and when said computer is moved or relocated, said switch closes, triggering said intrusion detection mechanism.

19. The method of claim 18 further including the steps of:

detecting the unauthorized removal of the covers of said computer system, triggers said intrusion detection mechanism.

20. The method of 16, further including the steps of:

providing said power supply in the form of a battery, sized to provide several minutes of operation of the computer system and all its integrated secondary storage devices.

21. The method of claim 16, further including the steps of:

providing said intrusion detection mechanism as a magnetic coupling of the continued proximity of the floor or table upon which said computer system rests.

22. The method of claim 16, further including the steps of:

providing an optional processor within said computer system, to take over the execution of an equivalent process in the event the central processing unit is inoperable.

23. The method of claim 16, further including the steps of:

triggering said intrusion mechanism, causes said system to be powered by the self contained power supply causing said computer to reset; and said ROM-based firmware program to take control and determine that an intrusion event occurred, thus erasing all data in said system and secondary storage.

24. The method of claim 16, further including the steps of:

personalizing said firmware, by means of tables stored in non-private RAM, to erase various user critical data first to assure their destruction.

25. A computer based security method to prevent unauthorized access to computer-stored information, comprising the steps of:

detecting an intrusion into said computer or of the unauthorized removal of the covers of said computer system, triggers an intrusion detection mechanism;

providing a self contained power supply to provide sufficient operation time for said computer to execute specific protective actions;

resetting the central processing unit of said computer, responsive to said intrusion detection;

switching to said self contained power supply responsive to said intrusion detection mechanism;

resetting said central processing unit of said computer responsive to said intrusion detection mechanism;

providing a ROM-based firmware program containing a procedure in said firmware program, to specify the data, files and objects in secondary storage, that are to be overwritten or deleted from said computer file system upon said intrusion, and upon said intrusion, said system immediately executes specific protection actions against sensitive data objects contained in a security priority list of data structures;

providing a processor within said computer system to take over the execution of an equivalent process in the event the central processing unit is inoperable; and triggering said intrusion mechanism,which causes said system to be powered by the self contained power supply causing said computer to reset; and said ROM-based firmware program takes control and determine that an intrusion event occurred, thus erasing all data in said system and secondary storage; and erasing various user critical data first, to assure their destruction by means of said firmware which is personalized by means of tables stored in non-private RAM.

26. The method of claim 25, further including the steps of:

employing a spring loaded switch within said computer system which is maintained in the electrically open position by the shear weight of said computer system and when the computer is moved, said switch closes, triggering said intrusion detection system.

\* \* \* \* \*